May 6, 1969

R. W. CREGIER 3,441,987

BAND MOUNTING CLIP

Filed May 8, 1967

Raymond W. Cregier
INVENTOR.

BY
Attorneys

May 6, 1969  R. W. CREGIER  3,441,987
BAND MOUNTING CLIP

Filed May 8, 1967  Sheet 2 of 3

Raymond W. Cregier
INVENTOR.

BY Clarence A. O'Brien
and Harvey B. Jackson
Attorneys

May 6, 1969

R. W. CREGIER 3,441,987

BAND MOUNTING CLIP

Filed May 8, 1967

Raymond W. Cregier
INVENTOR.

BY *Clarence A. O'Brien*
and *Harvey B. Jacobson*
Attorneys

United States Patent Office 3,441,987
Patented May 6, 1969

3,441,987
BAND MOUNTING CLIP
Raymond W. Cregier, Rte. 1, Box 430,
Port Orchard, Wash. 98366
Filed May 8, 1967, Ser. No. 636,876
Int. Cl. F16l *33/12;* B65d *63/08*
U.S. Cl. 24—271                                     6 Claims

ABSTRACT OF THE DISCLOSURE

A clamp assembly including an elongated flexible but stiff and deformable band-like tension member and an anchor assembly to which one end of the tension member may be secured and including a movable portion with which a reversely bent portion of the other end of the tension member may be engaged, the movable portion of the anchor assembly being shiftable between a first release position and a second locking position and including means operative to crimp and frictionally lock the reversely bent end portion of the tension member to the movable member as the latter is moved toward the locked position and subsequent final movement of the movable portion to the locked position serving to tension the tension member.

---

The band mounting clip has been specifically designed for securing elongated members such as pipe sections together and is particularly well adapted for use in shipboard installations of pipe sections. In addition, the band mounting clip may be utilized to secure pipe sections and the like to suitable supports and also bind suitable packing containers.

The main object of this invention is to provide an anchor assembly which may be utilized in conjunction with a strap-type tension member constructed of suitable material such as metal and which may perform the function of drawing the ends of the associated tension member together in a manner placing the tension member under tension and with the anchor assembly automatically determining the proper effective length of the tension member to be secured about an article or articles.

The anchor assembly includes means to which one end of the associated tension member may be secured and a movable portion with which a reversely bent portion on the other end of the associated tension member may be engaged. The movable portion of the anchor assembly includes means by which slack in the associated tension member may be taken up and the tension member may be progressively placed under tension as the movable portion of the clamp assembly is moved to its final locked position in which the end of the tension member secured to the movable portion is secured to the latter against longitudinal slipping relative thereto.

Another object of this invention is to provide a band mounting clip in accordance with the immediately preceding object and which main structural features and operating characteristics may be readily incorporated into various modified forms of mounting clips specifically designed for use in different environments.

Still another object of this invention is to provide a band mounting clip which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which FIGURE 1 is an end elevational view of a pipe section about which a tension band has been secured by mean of the mounting band clip of the instant invention;

Figure 1:
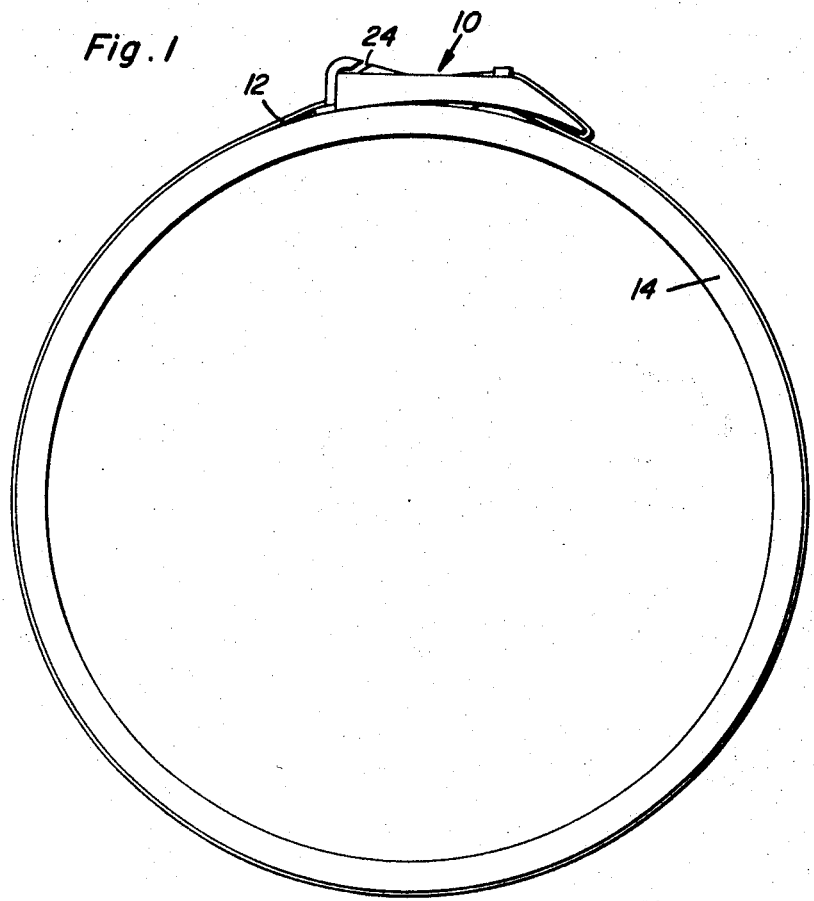
Figure 2:
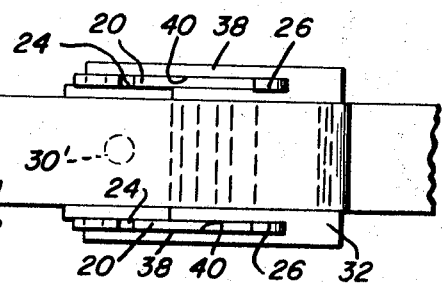
FIGURE 2 is a fragmentary plan view of the mounting clip and the adjacent end portions of the associated tension band.
Figure 8:
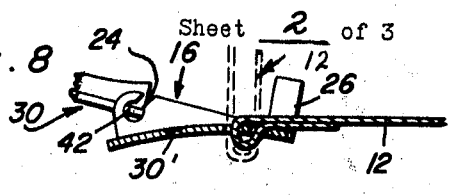
Figure 4:
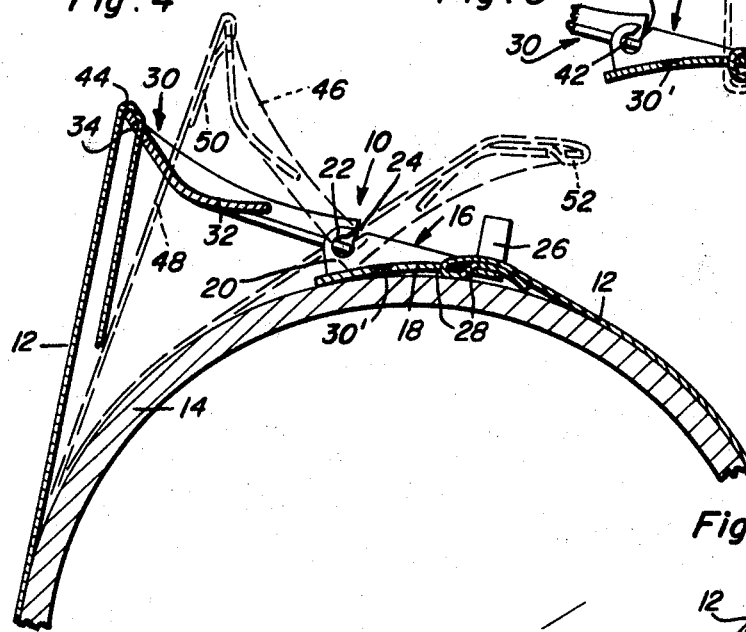
Figures 5, 9:
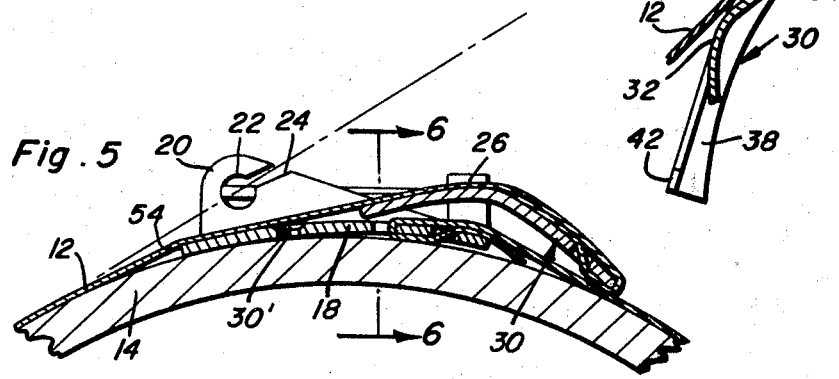
Figure 6:
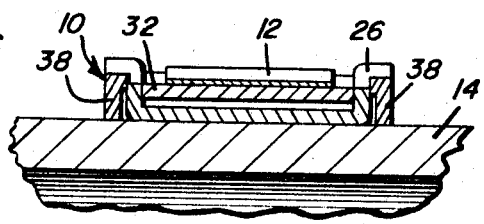
Figure 7:
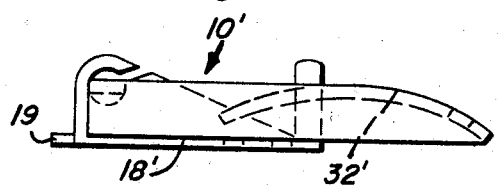
Figure 10:
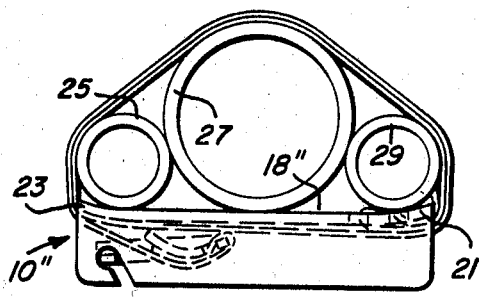
Figure 11:
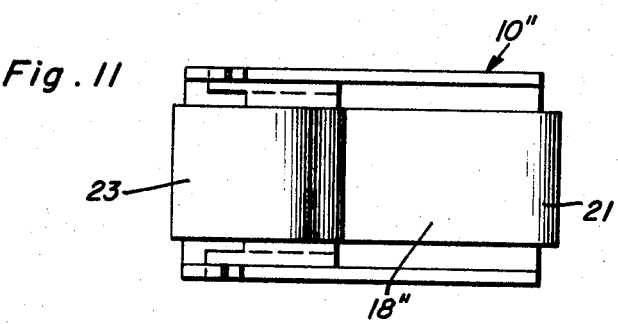
Figure 12:
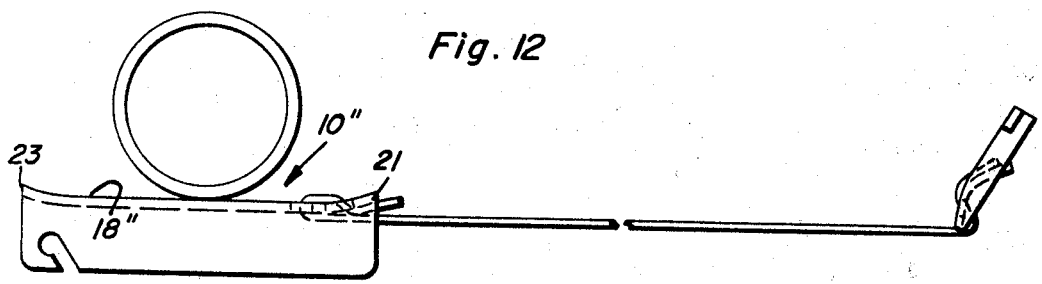
Figure 13:
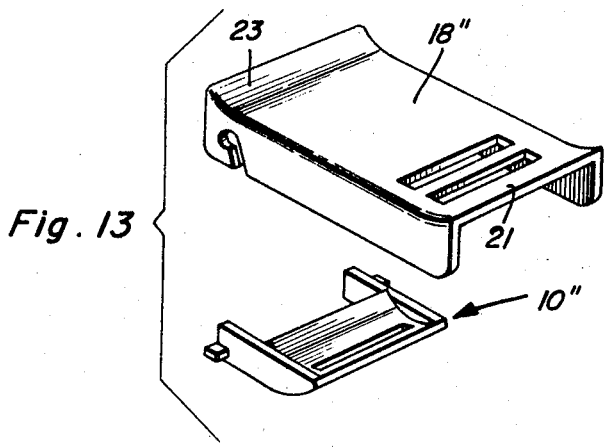

FIGURE 4 is a fragmentary vertical sectional view of the upper portion of the assemblage illustrated in FIGURE 1 and taken substantially upon a plane passing through the longitudinal centerline of the tension band with various positions of the movable portion of the clip and the associated end of the tension band illustrated in phantom lines and the movable portion of the clip illustrated in its inactive position in solid lines;

FIGURE 5 is a view similar to FIGURE 4 but on somewhat of an enlarged scale and illustrating the movable portion of the clip in its locking position;

FIGURE 6 is a transverse vertical sectional view taken substantially upon the plane indicated by the section line 6—6 of FIGURE 5;

FIGURE 7 is a side elevational view of a modified form of mounting clip;

FIGURE 8 is a fragmentary vertical sectional view taken substantially upon a plane passing through the longitudinal centerline of the clip illustarted in FIGURES 1–6 and showing the manner in which one end portion of the associated tension band is initially secured to the clip;

FIGURE 9 is a fragmentary vertical sectional view of the movable portion of the mounting clip illustrating the manner in which the end of the tension band secured thereto is automatically crimped and locked against longitudinal slipping relative to the movable portion of the clip as the movable portion is moved to its locking position;

FIGURE 10 is an end elevational view of a plurality of cylindrical pipe sections bound together by means of a further modified form mounting clamp whose base section defines a base from which all of the pipe sections are supported;

FIGURE 11 is a bottom plan view of the assemblage illustrated in FIGURE 10;

FIGURE 12 is an elevational view similar to FIGURE 10 but illustrating only one of the pipe sections supported from the base section of the mounting clamp and the arm portion and associated end of the tension member removed from operative engagement with the base section; and FIGURE 13 is an exploded perspective view of the mounting clamp illustrated in FIGURES 10–12.

Referring now more specifically to the drawings the numeral 10 generally designates the band mounting clip with which an elongated flexible band-type tension member 12 is operatively associated. The clip 10 is illustrated in FIGURE 1 of the drawings as securing the tension member 12 in a tensioned state about a cylindrical member 14.

Figure 3:
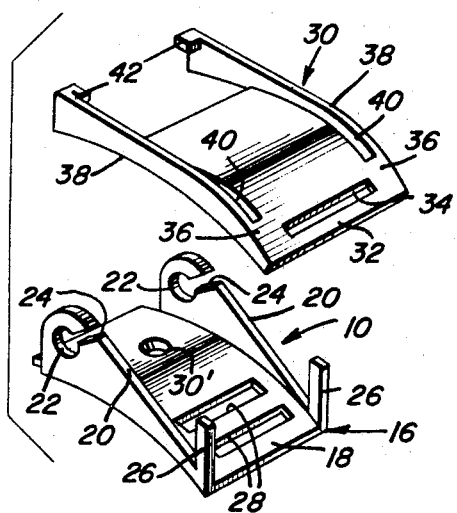
FIGURE 3 is an exploded perspective view of the mounting clip.

With attention invited specifically to FIGURE 3 of the drawings it may be seen that the clip 10, which defines an anchor assembly, includes an elongated base section referred to in general by the reference numeral 16. The base section 16 consists of an arcuate panel-like body 18 including longitudinally extending and laterally outwardly projecting plate-like mounting lugs 20 which project outwardly of the convex side of the body 18. The mounting lugs have aligned bores 22 formed therethrough adjacent one end of the body 18 and are also slotted as at 4 to provide entrance openings opening radially into the bores 22. The end of the body 18 remote from the bores 2 includes a pair of laterally outwardly projecting bendble tab portions 26 which also project outwardly of the onvex side of the body 18 and the latter is provided with a pair of transversely extending and longitudinally spaced lots 28 adjacent the end portion thereof from which the ab portions 26 project. Further, the body 18 is provided vith a countersunk opening 30′ formed through the end ortion thereof remote from the slots 28.

The clip 10 also includes an arm member referred to by the reference numeral 30 including an arcuate plateike body 32 having a transversely extending slot 34 ormed therein adjacent one end thereof. In addition, the nd of the body 32 in which the slot 34 is formed includes outwardly projecting portions 36 to which corresponding ends of a pair of generally parallel arm elements 38 are secured. The arm elements 38 project toward and beyond the remote end of the body 32 defining parallel slots 40 between the arm elements 38 and the adjacent side edges of the body 32.

The free ends of the arm elements 38 include inwardly projecting non-circular pivot stud-defining portions 42 and it may be readily appreciated that the pivot stud-defining portions 42 may be passed through the slots 24 so as to removably pivotally attach the arm member 30 to the mounting lugs 20 with the pivot stud-defining portions 42 rotatably received in the corresponding bores 22.

In securing one end of the tension member 12 to the base section 16, the end portion of the tension member 12 to be secured to the base section 16 is first inserted downwardly through the slot 28 closest the opening 30′ and then bent back upon itself so as to be receivable upwardly through the slot 28 farthest from the opening 30′ upon upward displacement of the corresponding end of the tension member 12 relative to the base section 16. Then, the tension member 12, which is preferably constructed of metallic material and which is flexible but stiff and deformable, is swung in a clockwise direction from the phantom line position thereof illustrated in FIGURE 8 of the drawings to the solid line position thereof illustrated in FIGURE 8 in order to tightly crimp the tension member 12 about the portion of the body 18 disposed between the slots 28.

Thereafter, the body 18 may be placed against the tubular or cylindrical pipe 14 in the manner illustrated in FIGURE 4 of the drawings and the free end of the tension member 12 may be wrapped about the pipe 14 and bent into a hook 44 in the manner illustrated in solid lines in FIGURE 4 with the free terminal end of the tension member 12 passed through the slot 34.

Assuming that there is very little slack in the tension member 12 when the arm member 30 is positioned as illustrated in solid lines in FIGURE 4, as the arm member 30 is pivoted from the inactive position thereof illustrated in solid lines in FIGURE 4 to the phantom line position designated by the reference numeral 46, the bent portion of the tension member 12 defining the hook 44 is slipped longitudinally relative to the free end of the arm member 30 until the reach 48 of the tension member 12 engages and begins to bend the free terminal end 50 thereof. At this point, slipping of the bent portion of the tension member 12 defining the hook 44 is increasingly frictionally resisted and further movement of the arm member 30 from the position 46 thereof to the position corresponding to the position thereof illustrated in FIGURE 9 will result in frictional resistance against longitudinal slipping of the tension member 12 relative to the arm member 30 being greatly increased and the free terminal end portion 50 of the tension member 12 being crimped into its final position. When the arm member 30 has been pivoted to the position thereof illustrated in FIGURE 9, all further longitudinal slippage of the tension member 12 is prevented and the final effective length of the tension member 12 is determined. The end of the tension member 12 attached or anchored to the arm member 30 has been fully bent into its final position locked against longitudinal shifting relative to the arm member 30 and swinging movement of the arm member 30 from the position thereof illustrated in FIGURE 9 to the phantom line position designated by the reference numeral 52 in FIGURE 4 serves to further tension the tension member 12. When the arm member 30 is in the phantom line position 52 illustrated in FIGURE 4, it is in its center position and final movement of the arm member 30 from the phantom line position 52 to the solid line position thereof illustrated in FIGURE 5 constitutes movement of the arm member 30 to a slightly over center position whereby the tension of the tension member 12 resists swinging movement of the arm member 30 in a counterclockwise direction as viewed in FIGURE 5.

The body 32 is bowed and the tension member 12 is bent about the end edge 54 of the body 18, see FIGURE 5, to reduce foreshortening of the tension member 12 as the arm member 30 is swung from the phantom line center position 52 of FIGURE 4 to the over center position illustrated in FIGURE 5.

As the arm member 30 is swung to the position thereof illustrated in FIGURE 5, the tab portions 26 are received through the slots 40 and the upper ends of the tab portions 26 may be bent outwardly over the base ends of the arm elements 38 to provide an "explosion proof" construction positively preventing swinging movement of the arm member 30 from the position thereof illustrated in FIGURE 5.

With attention now invited more specifically to FIGURE 7 of the drawings there may be seen a modified form of clamp generally referred to by the reference numeral 10′ and which includes a generally planar body 18′ corresponding to the body 18 and a more sharply curved body 32′ corresponding to the body 32. Further, the body 18 includes a positive lip or end marginal edge 19 which may, together with the adjacent end of the body 18′, be bent upwardly to compensate for or take up partial loss of tension of the associated tension member. Otherwise, the clamp 10′ is substantially identical to the clamp 10.

With reference now more specifically to FIGURES 10–13, there may be seen a modified form of clamp referred to in general by the reference numeral 10″ and which is quite similar to the clamps 10 and 10′ except that the body 18″ is considerably longer and the clamp 10″ does not include tab portions corresponding to tab portions 26. Further, the body portion 18′ is substantially planar except for the opposite ends thereof which are curved upwardly as at 21 and 23 thereby adapting the clamp 10″ to be utilized in securing the different size pipe sections 25, 27 and 29 together in the manner illustrated in FIGURE 10.

Of course, the free end portion of the body 32 may also be bent upwardly to compensate for a slight loss of tension in the tension member 12 and, if desired, the opening 30′ may have a suitable fastener secured therethrough for securing the body 18 to an article which is to be bound by the tension member 12.

The clamp 10′ may of course be utilized in conjunction with tension members similar to tension member 12 which are to be bound about objects including flat sides and it is to be noted that any portions of the clamps 10, 10′ and 10″ may be more heavily constructed if the environment in which they are to be used warrants increased strength.

What is claimed as new is as follows:

1. In combination with an elongated tension member including at least one end portion constructed of somewhat flexible but stiff and tensionable metallic material, an anchor and band tensioning assembly to which the opposite ends of said tension member may be anchored and by which the correct effective length of said tension member may be automatically effected prior to said tension member being placed under tension by said assembly, said assembly including a first base section to which the other end portion of said member is anchored, an elongated lever having one end pivotally secured to said first section for swinging movement of the other end of said lever about an axis extending transversely of said lever between first and second positions relative to said first section, the other end of said lever having an opening formed therethrough through which an inwardly reversely bent portion of said one end portion is removably inserted when said lever is in said first position and operative, upon swinging movement of said lever to said second position, to sharply crimp said reversely bent portion along a plurality of transversely extending zones thereof spaced longitudinally therealong in a manner to anchor said reversely bent portion of said one end portion of said tension member to said lever against longitudinal shifting relative thereto, said lever including a generally arcuate portion extending longitudinally thereof from said opening toward said one end of said lever over which the free inserted end of said reversely bent portion and the adjacent portion of said one end portion are bowed as said lever is swung to said second position, said second position comprising a center position in which said tension member, when entrained about an article, may be placed under tension.

2. The combination of claim 1 wherein said first section includes means operative to retain said lever in said second position.

3. The combination of claim 1 wherein said lever may be swung at least slightly past said center position toward an over center position.

4. The combination of claim 1 wherein said lever is removably pivotally secured to said first section and is freely separable therefrom upon displacement of said lever member laterally of its axis of rotation relative to said first section when said lever is in said first position.

5. The combination of claim 1 wherein said elongated lever includes a pair of generally parallel arm elements interconnected at one pair of corresponding ends by an integral portion thereof extending therebetween in which said opening is formed, said arcuate portion comprising an extension of said integral portion extending toward the other pair of ends of said arm elements and including opposite side edge portions spaced inwardly of the corresponding arm elements defining slots between said arm elements and said arcuate portion.

6. The combination of claim 5 wherein said base section includes outstanding generally parallel and bendable tab portions receivable in and projectable at least partially through said slots upon movement of said lever to said second position, the outer ends of said tab portions being bendable over the base ends of said arm elements adjacent said integral portion for retaining said lever in said second position.

References Cited
UNITED STATES PATENTS

| | | | |
|---|---|---|---|
| 866,535 | 9/1907 | Sudell | 24—192 |
| 991,192 | 5/1911 | Battenfeld. | |
| 2,389,202 | 11/1945 | Leland. | |
| 2,390,232 | 12/1945 | Venditty | 24—271 |
| 2,449,798 | 9/1948 | Weber | 24—270 |
| 3,228,083 | 1/1966 | Gardner et al. | 24—271 |

FOREIGN PATENTS

| | | |
|---|---|---|
| 683,058 | 2/1930 | France. |
| 819,481 | 10/1951 | Germany. |

DONALD A. GRIFFIN, *Primary Examiner.*